United States Patent
Eng et al.

(10) Patent No.: US 9,367,298 B1
(45) Date of Patent: Jun. 14, 2016

(54) BATCH CONFIGURATION MODE FOR CONFIGURING NETWORK DEVICES

(75) Inventors: Wing Eng, Ithaca, NY (US); Sri Ram Sankar, Bangalore (IN); Pallavi Mahajan, Ghaziabad (IN)

(73) Assignee: Juniper Networks, Inc., Sunnyvale, CA (US)

( * ) Notice: Subject to any disclaimer, the term of this patent is extended or adjusted under 35 U.S.C. 154(b) by 1102 days.

(21) Appl. No.: 13/432,706

(22) Filed: Mar. 28, 2012

(51) Int. Cl.
*G06F 15/177* (2006.01)
*G06F 9/445* (2006.01)
*G06F 9/44* (2006.01)

(52) U.S. Cl.
CPC .... *G06F 8/65* (2013.01); *G06F 8/71* (2013.01)

(58) Field of Classification Search
CPC .............. G06F 8/65; G06F 8/68; G06F 8/71
USPC ........................................... 709/221; 717/68
See application file for complete search history.

(56) References Cited

U.S. PATENT DOCUMENTS

| | | | |
|---|---|---|---|
| 5,497,316 A | 3/1996 | Sierk et al. |
| 5,517,646 A | 5/1996 | Piccirillo et al. |
| 5,600,262 A | 2/1997 | Kolze |
| 5,835,501 A | 11/1998 | Dalmia et al. |
| 5,835,601 A | 11/1998 | Shimbo et al. |
| 5,887,151 A | 3/1999 | Raz et al. |
| 6,014,669 A | 1/2000 | Slaughter et al. |
| 6,141,759 A | 10/2000 | Braddy |
| 6,240,414 B1 | 5/2001 | Beizer et al. |
| 6,393,419 B1 | 5/2002 | Novak et al. |
| 6,480,955 B1 | 11/2002 | DeKoning et al. |
| 6,526,574 B1 | 2/2003 | Jones |
| 6,529,905 B1 | 3/2003 | Bray et al. |
| 6,587,124 B1 | 7/2003 | Slaby |
| 6,671,699 B1 | 12/2003 | Black et al. |
| 6,901,580 B2 | 5/2005 | Iwanojko et al. |
| 6,907,603 B2 | 6/2005 | Scott |
| 6,996,372 B2 | 2/2006 | Noerpel et al. |
| 6,996,672 B2 | 2/2006 | Lubbers et al. |
| 7,000,161 B1 | 2/2006 | Allen et al. |
| 7,043,537 B1 | 5/2006 | Pratt |
| 7,055,148 B2 | 5/2006 | Marsh et al. |
| 7,065,637 B1 | 6/2006 | Nanja |
| 7,130,870 B1 | 10/2006 | Pecina et al. |
| 7,233,975 B1 | 6/2007 | Gerraty et al. |
| 7,290,164 B1 | 10/2007 | Harvey et al. |
| 7,307,979 B2 | 12/2007 | Visser |
| 7,457,830 B1 | 11/2008 | Coulter et al. |
| 7,483,965 B1 | 1/2009 | Gerraty |

(Continued)

*Primary Examiner* — Glenford Madamba
(74) *Attorney, Agent, or Firm* — Shumaker & Sieffert, P.A.

(57) ABSTRACT

In general, techniques are described for a batch configuration mode for configuring network devices. A network device comprising a committed data source and a control unit may implement the techniques. The control unit may receive a plurality of separate commit commands instructing the network device to commit configuration changes to the committed data source. Each of the plurality of commit commands instructs the network device to commit an associated portion of the configuration changes to the committed data source. The control unit then groups two or more of the plurality of separate commit commands to form a batch of commit commands and executes the batch of commit commands to commit the portions of the configuration changes associated with the grouped commit commands to the committed data source as if the grouped portions of the configuration changes were associated with a single commit command.

24 Claims, 5 Drawing Sheets

(56) References Cited

U.S. PATENT DOCUMENTS

| | | |
|---|---|---|
| 7,558,835 B1 | 7/2009 | Shafer |
| 7,865,578 B1 | 1/2011 | Gerraty |
| 2001/0039519 A1 | 11/2001 | Richards |
| 2002/0065795 A1* | 5/2002 | Asherman ............ 707/1 |
| 2002/0161860 A1 | 10/2002 | Godlin et al. |
| 2002/0162049 A1 | 10/2002 | Takamoto et al. |
| 2002/0194015 A1 | 12/2002 | Gordon et al. |
| 2003/0037040 A1 | 2/2003 | Beadles et al. |
| 2003/0070063 A1 | 4/2003 | Boyle et al. |
| 2003/0101059 A1 | 5/2003 | Heyman |
| 2003/0121033 A1 | 6/2003 | Peev et al. |
| 2003/0149755 A1 | 8/2003 | Sadot |
| 2003/0212983 A1 | 11/2003 | Tinker |
| 2003/0225866 A1 | 12/2003 | Hudson |
| 2004/0032837 A1 | 2/2004 | Visser |
| 2004/0139179 A1 | 7/2004 | Beyda |
| 2005/0015471 A1 | 1/2005 | Zhang et al. |
| 2005/0086384 A1 | 4/2005 | Ernst |
| 2005/0114315 A1 | 5/2005 | Tanner et al. |
| 2005/0138375 A1 | 6/2005 | Sadjadi |
| 2006/0007944 A1 | 1/2006 | Movassaghi et al. |
| 2006/0031427 A1* | 2/2006 | Jain et al. ............ 709/220 |
| 2006/0123070 A1* | 6/2006 | Hickson ............ 707/205 |
| 2006/0167878 A1 | 7/2006 | Hartman |
| 2006/0168160 A1 | 7/2006 | Pratt |
| 2008/0295086 A1* | 11/2008 | Greenwood et al. ......... 717/168 |
| 2011/0320403 A1* | 12/2011 | O'Krafka et al. ............ 707/620 |

* cited by examiner

BATCH CONFIGURATION MODE FOR CONFIGURING NETWORK DEVICES

TECHNICAL FIELD

The invention relates to computer networks, and more particularly, to configuring devices within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices within the network, referred to as routers, maintain tables of routing information that describe available routes through the network. Each route defines a path between two locations on the network. Upon receiving an incoming data packet, the router examines header information within the packet to identify the destination for the packet. Based on the header information, the router accesses the routing table, selects an appropriate route for the packet and forwards the packet accordingly.

Conventional routers typically include a mechanism, referred to herein as a management interface, for directly or remotely configuring the router. By interacting with the management interface, various clients, such as human users and automated scripts, can perform numerous configuration tasks. For example, the clients may configure interface cards of the router, adjust parameters for the supported network protocols, specify the physical components within the routing device, modify the routing information maintained by the router, access software modules and other resources residing on the router, and the like.

In some routers, the management interface allows a client to configure the present configuration of the router using a commit-based model. In a commit-based model, a client issues one or more configuration commands, and then directs the management interface to apply the commands by issuing a "commit" command (alternatively, a "commit"). Typically, the client may direct the management interface to disregard the commands by issuing a "rollback" command.

For example, a client typically places the router in a configuration mode, often by issuing an edit command to the management interface. In this mode, the management interface may essentially "lock" the router, and reject any configuration commands from other clients. Next, the client typically issues a number of commands directing the management interface to modify the present configuration, followed by a commit command that directs the router to apply the configuration changes specified by the commands. Upon receiving the commit command, the management interface applies the changes to the present configuration, thereby adjusting the operation of the router. The management interface may then exit the configuration mode, effectively "unlocking" the router and allowing configuration by another client."

As the complexity of computing networks has increased, there has been an increasing need for routers and other network devices to support concurrent configuration by multiple clients. Consequently, some devices allow multiple clients to concurrently issue configuration commands. In other words, the management interface of such a device does not "lock" the configuration of the device to a single client, but receives configuration commands from multiple clients while operating in the configuration mode. When the management interface receives a commit command from any of the clients providing commands, the management interface applies all of the pending changes from all of the concurrent clients to the present configuration. These techniques can be problematic in that partial changes made by a client may be committed in response to a commit command from another client. Furthermore, uncommitted changes made by a client may be lost when another client issues a "rollback" command.

As a result, routers have been adapted to provide for a private configuration mode in which a client may operate on a copy of the configuration data of the router separate from the current configuration data. When a commit is issued by the client in this private configuration mode, the router updates the current configuration data to reflect any changes made by the client to the copy of the configuration data without committing any other configuration changes to the configuration data by other clients. While in this private configuration mode, the router does not lock the actual configuration considering that the client is operating on a copy of the current configuration data. As a result, the router may enable multiple clients to operate concurrently in the private configuration mode, each of which may be operating on a separate copy of the configuration data.

While the private configuration mode may facilitate concurrent configuration of the router, the concurrent configuration mode may result in the router receiving multiple commit commands from multiple clients within a short period of time (if not, nearly concurrently). The router may store these commit commands to what may be referred to as a "commit queue" and process these commit commands sequentially in the order these commit commands were stored to the commit queue. Consequently, the router may not execute the commit command stored last in the commit queue for multiple seconds (or even minutes), resulting in significant delay that may detract from the user experience.

SUMMARY

In general, techniques are described for enabling a network device to perform batch configuration operations. More specifically, the techniques may enable a network device, such as a router, to operate in a batch configuration mode in which configuration changes associated with multiple commits are grouped together to form a batch job. The batch job may effectively enable the network device to commit configuration changes associated with multiple commit commands together in a single configuration operation, rather than committing the configuration changes sequentially. For example, the techniques may aggregate configuration changes, for which respective commit commands have been received, made to respective copies of the configuration data and commit the aggregated configuration changes to the current configuration data of the network device as if the aggregated configuration changes were a single configuration change responsive to a single commit. By aggregating the configuration changes across multiple copies and committing these changes in the aggregate, the techniques may increase the number of commits that a router may perform during a given period of time (which may, in other words, increase throughput of device configuration changes). The improved commit command throughput may reduce delays in performing commit commands and, thereby, result in an improved user experience in comparison to conventional routers that execute commit commands in a sequential and separate manner.

In one aspect, a method comprises receiving, with a network device, a plurality of separate commit commands instructing the network device to commit configuration changes to a committed data source that stores current configuration data for the network device, wherein each of the plurality of commit commands instructs the network device to commit an associated portion of the configuration changes to the committed data source, grouping, with the network device, the portions of the configuration changes associated with two or more of the plurality of separate commit commands to form a batch job and executing the batch job to commit the grouped portions of the configuration changes associated with the two or more of the plurality of separate commit commands to the committed data source as if the grouped portions of the configuration changes were associated with a single commit command.

In another aspect, a network device comprises a committed data source that stores current configuration data for the network device and a control unit that receives a plurality of separate commit commands instructing the network device to commit configuration changes to the committed data source, wherein each of the plurality of commit commands instructs the network device to commit an associated portion of the configuration changes to the committed data source. The control unit groups two or more of the plurality of separate commit commands to form a batch of commit commands, wherein the batch of commit commands instructs the network device to commit the portions of the configuration changes associated with the grouped two or more of the plurality of separate commit commands to the committed data source and executes the batch of commit commands to commit the portions of the configuration changes associated with the grouped two or more of the plurality of separate commit commands to the committed data source as if the grouped portions of the configuration changes were associated with a single commit command.

In another aspect, a non-transitory computer-readable medium comprising instructions that, when executed, cause one or more processor of a network device to receive a plurality of separate commit commands instructing the network device to commit configuration changes to a committed data source that stores current configuration data for the network device, wherein each of the plurality of commit commands instructs the network device to commit an associated portion of the configuration changes to the committed data source, group two or more of the plurality of separate commit commands to form a batch of commit commands, wherein the batch of commit commands instructs the network device to commit the portions of the configuration changes associated with the grouped two or more of the plurality of separate commit commands to the committed data source and execute the batch of commit commands to commit the portions of the configuration changes associated with the grouped two or more of the plurality of separate commit commands to the committed data source as if the grouped portions of the configuration changes were associated with a single commit command.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
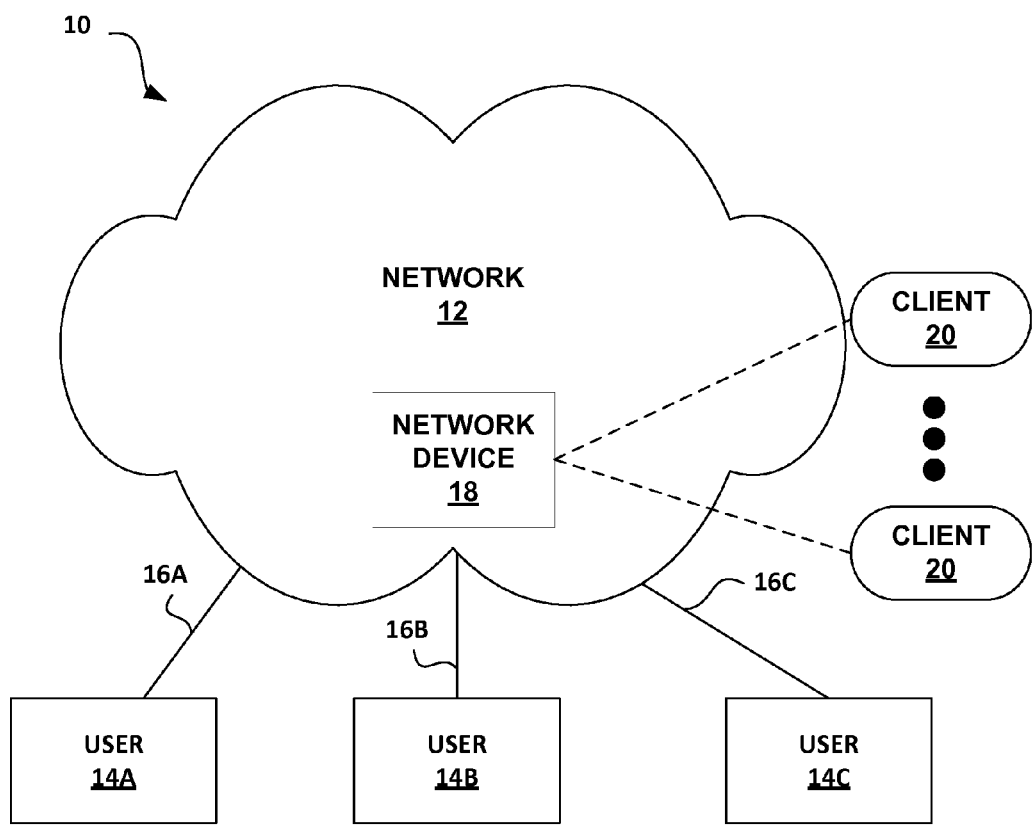
FIG. 1 is a block diagram illustrating an example network system having a network device that supports batch execution of configuration commands in accordance with the techniques described in this disclosure

FIG. 1 is a block diagram illustrating an example network system 10 that implements the batch execution of configuration commands in accordance with the techniques described in this disclosure. Network system 10 comprises a network 12 that may be accessed by users 14A to 14C (collectively users 14) via one of links 16A to 16C (collectively links 16). Each of users 14 represents an entity, such as an individual or an organization, that accesses network 12 to communicate with other users connected to network 12. Links 16 may be Ethernet or other network connections.

Network 12 includes a network device 18, which represents any type of device capable of operating within network system 10, such as a network hub, network switch, network router, or the like. Network device 18 may include an interface that allows various clients 20, such as human users, automated scripts executed by a computing device or network management system (NMS), to configure network device 18 by specifying protocols to follow, physical arrangements of hardware, or the like. For example, network device 18 may be a network router, and clients 20 may specify configuration information to configure interface cards of the router, adjust parameters for the supported network protocols, specify the physical components within the routing device, modify the routing information maintained by the router, and/or access software modules and other resources residing on the router to name a few examples.

Network device 18 may supports a command syntax in which a configure command may optionally specify a particular configuration mode. More specifically, the configure command may include an additional parameter that specifies an exclusive mode or a private mode. Upon receiving a configure exclusive command from one of clients 20, network device 18 locks the primary configuration, and only allows the requesting client to make changes to the present configuration.

In response to a configure private command from one of clients 20, network device 18 enters a private configuration mode in which multiple clients 20 can issue configuration commands to device 18. In particular, for each of clients 20 that issues a configure private command, network device 18 creates a respective private data source from a committed data source that stores the present or current configuration of the device. Network device 18 applies subsequent configuration commands from clients 20 to their respective private data sources. Upon receiving a commit command from any given one of clients 20, network device 18 merges the edited data of the private data source into configuration data of the committed data source. In particular, network device 18 generates a "patch" representing the changes to the private data source, and applies the patch into the committed data source.

When applying the patch, network device 18 resolves any conflicts that may exist between the private data source being committed and any changes to the committed data source made by other clients 20 while the private data source was being edited. If one of clients 20 issues a rollback command when in private configuration mode, only the respective private data source created for the client is discarded and refreshed. Consequently, clients 20 may edit the private data source without risk of premature commitment of the changes, or loss of the changes, due to another one of clients 20.

While the private configuration mode may facilitate concurrent configuration of network device 18, this concurrent configuration mode may result in network device 18 receiving multiple commit commands from multiple clients within a short period of time (and possibly, nearly concurrently). Network device 18 may then store these commit commands to what may be referred to as a "commit command queue" and process these commit commands sequentially in the order these commit commands were stored to the commit command queue. Consequently, network device 18 may not execute the commit command stored last to the commit queue for multiple seconds (or even minutes), resulting in significant delay that may detract from the user experience.

To illustrate, assume multiple clients 20 each concurrently establish a session with network device 18 to configure network device 18. Network device 18 may therefore maintain a plurality of configuration sessions with multiple ones of clients 20. Via these sessions, each of these ones of clients 20 may enter a private configuration mode, where network device 18 generates a private data source from the committed data source. Clients 20 may further, via their respective sessions, edit the private data source, effectively making configuration changes to the private data source. Two or more of clients 20 may finish making configuration changes within a short period of time from one another and specify a commit command. Network device 18 receives these commit commands and stores them to the commit command queue, executing these commit commands sequentially in the order in which the respective commit commands were received with respect to one another. Each commit command may require multiple seconds to execute, as committing the changes to the committed data source may involve a process to ensure the changes to be committed will not result in a failed or nonoperational state once committed. Thus, if many commit commands are issued within a short period of time from one another, network device 18 may not even begin to process the last commit command enqueued to the commit command queue for potentially tens of seconds or possibly a minute or longer from the time at which network device 18 received the last commit command.

In accordance with the techniques described in this disclosure, network device 18 may perform batch configuration operations to potentially improve data configuration throughput. More specifically, the techniques may enable network device 18 to execute in a batch configuration mode in which network device 18 may aggregate or group configuration changes associated with two or more commit commands to form a batch job. Network device 18 may then execute the batch job to effectively commit configuration changes that are associated with multiple separate commit commands as a single operation, rather than committing the configuration changes sequentially. In other words, the techniques may aggregate configuration changes to configuration data for which a commit command has been received and commit all of the configuration changes across these copies of the configuration data (i.e., the private data sources in the above example) to the committed data source. By aggregating the configuration changes across multiple copies of the configuration data and committing these changes in the aggregate, the techniques may increase the number of commits that network device 18 may perform during a given period of time (which may, in other words, increase throughput of device configuration changes). The improved commit command throughput may reduce delays in performing commit commands and thereby result in an improved user experience in comparison to conventional routers that execute commit commands in a sequential and separate or individual manner.

In operation, network device 18 receives a plurality of separate commit commands instructing network device 18 to commit configuration changes to the committed data source that stores current configuration data for network device 18. As noted above, each of the plurality of commit commands instructs the network device to commit an associated portion of the configuration changes (i.e., those made with respect to associated ones of the private data sources in the example above) to the committed data source. Network device 18 then groups configuration changes associated with two or more of the plurality of separate commit commands, thereby forming a batch job. Network device 18 then executes the batch job to commit the portions of the configuration changes associated with the two or more of the plurality of separate commit commands to the committed data source.

In the context of private data sources, rather than repeatedly determining any changes between the private data source for which a commit command has been received and the committed data source, validating the determined changes to ensure the changes will not result in the failure of network device 18, and entering the changes to the committed data source, the techniques may effectively merge multiple private data sources for which a commit command has been received, validate the merged private data sources to ensure the changes will not result in the failure of network device 18, and enter the merged private data sources to the committed data source. By aggregating the process in the manner described above, the techniques may increase the number of commits that network device 18 may perform during a given period of time, thereby potentially improving the user experience.

Figure 2:
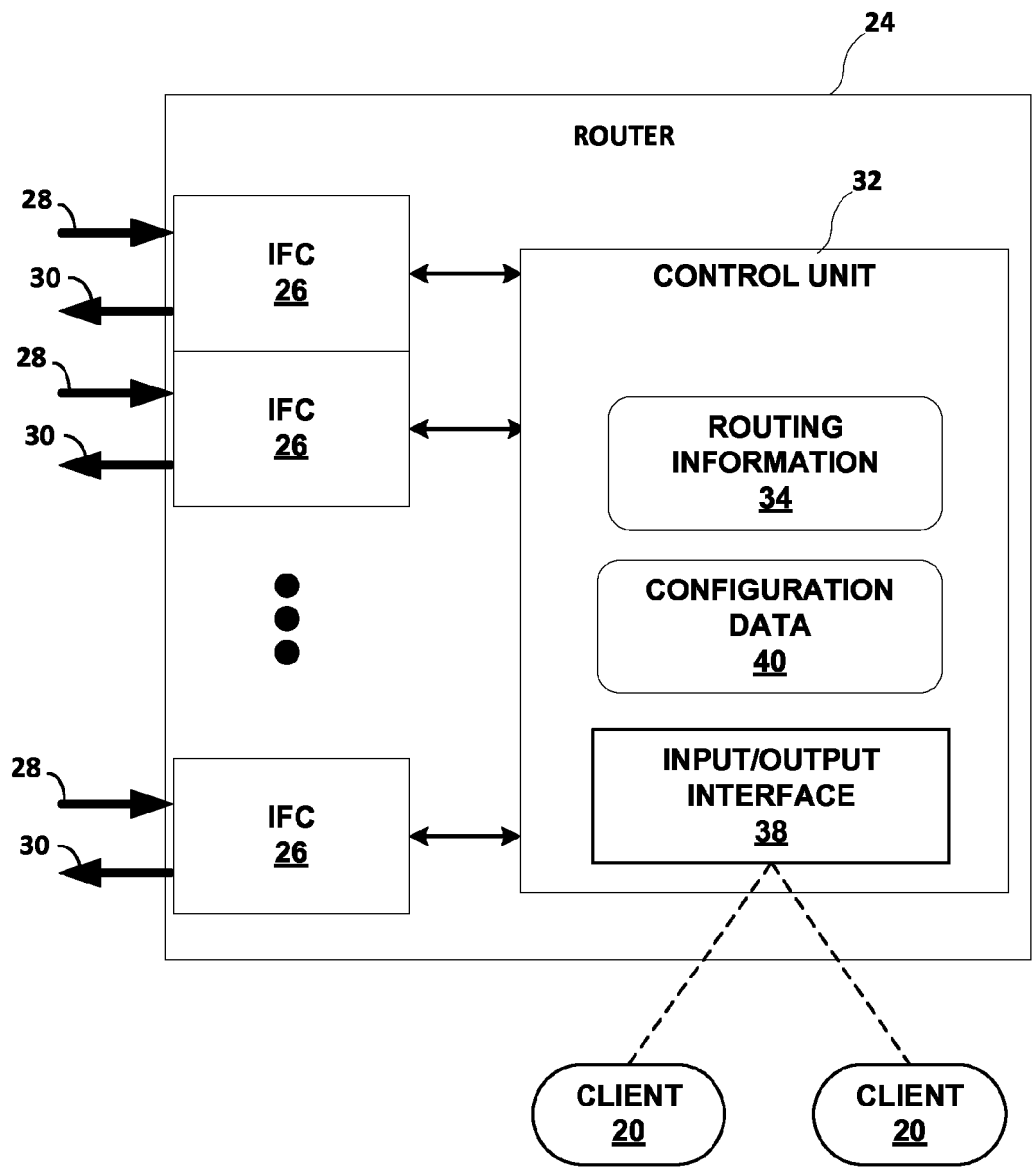
FIG. 2 is a block diagram illustrating an example network router that supports a batch configuration mode consistent with the techniques described in this disclosure.

FIG. 2 is a block diagram illustrating an example network router 24 that supports the batch execution of configuration commands in accordance with the techniques described in this disclosure. Router 24 includes a set of one or more interface cards (IFCs) 26 that receive and send packets via network links 28 and 30, respectively. IFCs 26 are typically coupled to network links 28, 30 via one or more interface ports.

Router 24 further comprises a control unit 32 that maintains routing information 34. Routing information 34 describes the topology of network 12 and, in particular, routes through network 12. Routing information 34 may include, for example, route data that describes various routes within network 12, and corresponding next hop data indicating appropriate neighboring devices within network 12 for each of the routes. Routing information 34 is periodically updated to accurately reflect the topology of network 12. In general, router 24 receives a packet via inbound network link 28 and control unit 32 determines the destination address of the packet and outputs the packet on an outbound network link 30 based on the destination.

Control unit 32 may receive configuration input from one or more of clients 20 via an input/output (I/O) interface 38. I/O interface 38 may be a command line interface (CLI) or other suitable interface, for processing user or script-driven commands. Control unit 32 may store the configuration input received from one or more of clients 20 as configuration data 40, which may take the form of a text file, such as an ASCII file. Alternatively, control unit 32 may process the configuration input and generate configuration data 40 in any one of a number of forms, such as one or more databases, tables, data structures, or the like.

In response to receiving a configure command, a management module of router 24 may parse the command, and place router 24 in a configuration mode for receiving configuration data 40 from one of clients 20. Configuration data 40 may take the form of one or more commands for adding new settings to the current configuration of the router, commands for deleting or modifying existing settings of the current configuration, or combinations thereof. Router 24 may further parse configuration data 40, input from one or more of clients 20, and resolve the references to appropriately configure router 24. Upon receiving a commit command, the management module applies configuration data 40 to router 24.

In this manner, a syntax for the configuration command may be expressed as follows:

configure [configuration mode], where configuration mode may specify private or exclusive, and is optional (as denoted above by the use of square brackets '[' and ']').

The following pseudocode illustrates an exemplary use of a configure command having a "private" configuration mode:

user@host> configure private
user@host# set system host-name router_25
user@host# commit In the above pseudocode client 20 issues a configure private command directing router 24 to enter a configuration mode and, more particularly, to enter a private configuration mode. While in the private configuration mode, client 20 then issues a command to modify the current host name of router 24, i.e., set system host-name. Finally, client 20 issues a commit command directing router 24 to verify and accept the changes.

As described above, one or more of clients 20 may interface with router 24 via input/output interface 38 to concurrently configure router 24. In instances where multiple ones of clients 20 are concurrently entering configuration data 40, each of these multiple ones of clients 20 may enter the private configuration mode and input configuration data 40. Often, these multiple ones of clients 20 may specify configuration data 40 and then attempt to commit the input configuration data 40 within short periods of time of one another (and may, in some instances, attempt to commit the configuration data 40 nearly concurrently).

The commit process, however, as noted above may involve a number of sub-processes that check the integrity of entered configuration data 40 before committing entered configuration data 40 to the operational or current configuration data. In other words, control unit 32 of router 24 may, upon receiving a commit command, verify that configuration data 40 input by the one of clients 20 that entered the commit command, will not result in router 24 becoming inoperative. Given the complexity of routers 24, especially those of routers 24 that serve in the core of service provider networks that provide data throughput on the order of hundreds of gigabytes per second, control unit 32 may implement an involved integrity checking process with respect to any entered configuration data 40 that is to be committed. This process may take multiple seconds, if not more time, to complete. Consequently, control unit 32 may store commit commands to a commit queue, which, while not shown in FIG. 2, is described in more detail with respect to FIG. 3 below. This commit queue may buffer commit commands that are received by control unit 32 in a short amount of time until control unit 32 may implement the verification process with respect to each of the commit commands.

Rather than perform this process sequentially with respect to each commit command in the commit queue, control unit 32 may implement the techniques described in this disclosure to batch commit commands (or, in other words, form a batch job), thereby grouping configuration data 40 associated with multiple different commits from, often, multiple different ones of clients 20 into a single group of configuration data 40. Control unit 32 may then perform the verification process with respect to grouped configuration data 40, which may significantly reduce the time required to commit the associated configuration data 40 in comparison to sequentially processing configuration data 40 associated with each of the commit commands stored to the commit queue. More detail with respect to how control unit 32 may group configuration data 40 is described below with respect to the example of FIG. 3.

Figure 3:
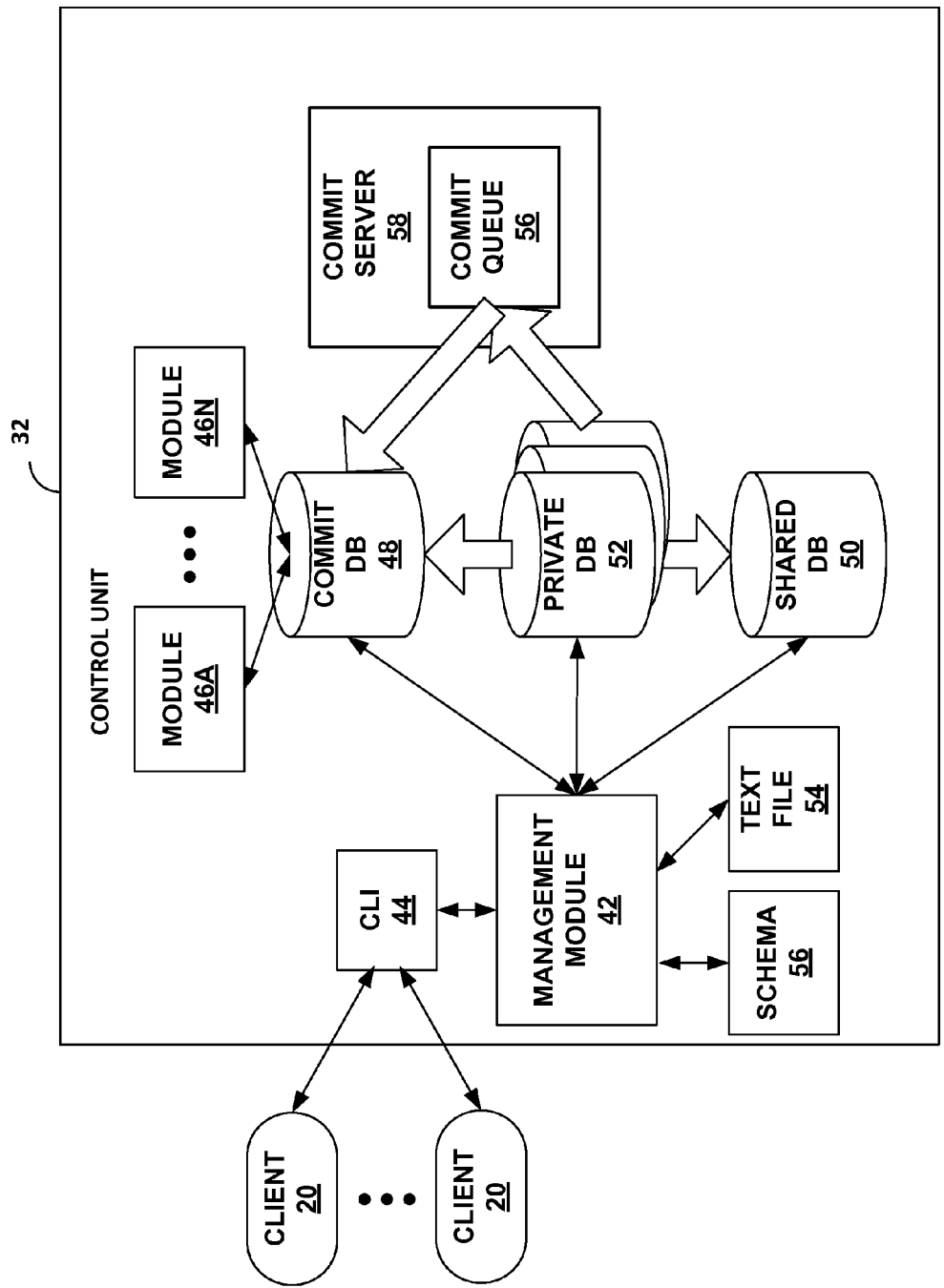
FIG. 3 is a block diagram illustrating an example control unit that supports operation in a batch configure mode consistent with the techniques described in this disclosure.

FIG. 3 is a block diagram illustrating an example control unit 32 that supports batch commit commands in accordance with the techniques described in this disclosure. Control unit 32 comprises a management module 42 that communicates with one or more of clients 20 via a command line interface (CLI) 44. CLI 44 serves as a daemon process that listens for requests from clients 20. Upon receiving a request from one of clients 20, CLI 44 may relay the request to management module 42. However, CLI 44 may give way to direct communication between client 20 and management module 42.

Control unit 32 may further include one or more software modules 46A to 46N, collectively referred to as "software modules 46." Software modules 46 represent processes (which may also be referred to as "threads of execution"), and typically execute within an operating environment provided by an operating system. Software modules 46 may, for example, include a routing protocol module to administer protocols supported by router 24, a chassis module to account for the physical components of router 24, a device configuration module to control the physical configuration of router 24 or the like.

Control unit 32 may include a committed data source (referred to as committed database (COMMIT DB) 48) that stores a present configuration of router 24. In other words, router 24 operates in accordance with configuration information stored in committed database 48. Control unit 32 may further include a shared data source (referred to as shared database (SHARED DB) 50) that contains a copy of the configuration data of committed database 48, and is typically used for editing the configuration without impacting operation of router 24. For example, clients 20 may access shared database 50 simultaneously and each of clients 20 may make changes to the configuration data stored in shared database 50.

Management module 42 may receive a command from one of clients 20 to configure router 24. Management module may parse the command from client 20, and place router 24 in the configure mode requested by client 20. Router 24 may be configured using one of several different configuration modes, such as a default configuration mode (referred to as configure mode), an exclusive configuration mode, a private configuration mode, or the like.

By issuing a configuration command without specifying a configuration mode, management module 42 operates in the default configuration mode and allows clients 20 to concurrently edit configuration data in shared database 50. If one of clients 20 issues a commit command, all of the changes, complete or incomplete, made by clients 20 may be committed to committed database 48.

In exclusive configuration mode, management module 42 allows one of clients 20 to edit configuration data of shared database 50. However, when configuring in exclusive configuration mode, shared database 50 may be locked, allowing for only one client 20 at a time to edit configuration data of shared database 50. The lock may further prevent client 20 from creating any interference from other clients 20 when issuing a commit or rollback command. When receiving a commit command from the client 20 for which an exclusive lock has been granted, management module 42 copies shared database 50 to the committed database 48.

In private configuration mode, management module 42 allows clients 20 to edit configuration data in respective private data sources, referred to as private databases (PRIVATE DB) 52. For each of clients 20 that issue a configure private command, management module 42 creates a respective private database 52, each of which represent a copy of committed database 48 created at the time the management module 42 receives the corresponding configure command. In addition, management module 42 may generate a copy of a configuration text file 54, such as an ASCII configuration file, which may contain configuration data that is used by control unit 32 during restart. Upon receiving a commit command from any given one of clients 20, management module 42 generates a patch by comparing changes made to private database 52 with the configuration data of text file 54. Management module applies the patch into committed database 48, and resolves any conflicts that may exist between private database 52 being committed and any changes to the committed database 48 made by other clients 20 while the private database was being edited.

More information regarding the private configure mode, patch generation and application of a patch can be found in U.S. Pat. No. 7,233,975, entitled "PRIVATE CONFIGURATION OF NETWORK DEVICES," filed Aug. 19, 2002; U.S. Pat. No. 7,558,835, entitled "APPLICATION OF A CONFIGURATION PATCH TO A NETWORK DEVICE," filed Mar. 17, 2003; U.S. Pat. No. 7,483,965, entitled "GENERATION OF A CONFIGURATION PATCH FOR NETWORK DEVICES," filed Jan. 9, 2003; and U.S. Pat. No. 7,865,578, entitled "GENERATION OF A CONFIGURATION PATCH FOR NETWORK DEVICES," filed Nov. 20, 2006, each of which is hereby incorporated by reference as if set forth herein in their entirety.

Independent of the configuration mode entered by client 20, upon issuing a commit command, management module 42 validates the updated configuration. In one example, management module 42 determines whether the configuration data conforms to a schema 55 of the committed database. More specifically, schema 55 describes a proper syntax to which the configuration information must conform in order to be compatible with all of software modules 46. In addition, management module 42 may direct software modules 46 to validate specific parameters or settings within the updated configuration data.

Based on the validation, management module 42 may either reject the pending configuration data, or accept the pending configuration data. For example, management module 42 may accept the pending configuration data, and update the configuration data of committed database 48 to reflect the changes made by client 20. Management module 42 may then proceed to notify software modules 46 that committed database 48 contains updated configuration information. Software modules 46 may retrieve the new configuration data from committed database 48, and router 24 may begin to operate in accordance with the new configuration data.

This process of determining the difference and then validating the entered configuration data may take several seconds or more time. Typical delays are often 30 seconds or more, where delays of this order result in a poor user experience. To illustrate, assume five of clients 20 are concurrently interfacing with CLI 44 to enter configuration data via 5 different TTY sessions, which are assumed to be virtual TTY session and may be denoted as "Vty1," "Vty2," "Vty3," "Vty4" and "Vty5." Moreover, assume a standard delay to process configuration data after receiving a commit command to be 30 seconds and that each of the five different ones of clients 20 each, after entering configuration data, nearly concurrently enter a commit command. The following Table 1 illustrates how conventional routers that do not implement the batch commit process in accordance with the techniques of this disclosure may process the commit commands.

TABLE 1

| Time | Vty1 | Vty2 | Vty3 | Vty4 | Vty5 |
|---|---|---|---|---|---|
| 0 | set a | set b | set c | set d | set e |
| 0 | commit | commit | commit | commit | commit |
| 30 s | done | . . . | . . . | . . . | . . . |
| 1 m | | done | . . . | . . . | . . . |
| 1 m 30 s | | | done | . . . | . . . |
| 2 m | | | | done | . . . |
| 2 m 30 s | | | | | done |

In Table 1, this router sequentially processes each of the commits entered via Vty1-Vty5 at or around time 0. The router first processes the commit command received from Vty1, taking approximately 30 seconds to process this commit command. Next, the router processes the commit command received from Vty2, taking an additional 30 seconds to process this second commit command after being delayed by 30 seconds to process the first commit command. The router continues in this sequential manner until all five of the commit commands are processed taking approximately two minutes and 30 seconds to complete the fifth commit command received via Vty5.

In comparison, the following Table 2 illustrates the batch commit process as implemented by management module 42 of control unit 32 in accordance with the techniques described in this disclosure. Maintaining the assumptions made above with respect to Table 1 when considering Table 2, Table 2 demonstrates how router 24 may significantly reduce the amount of time required to process multiple commit commands through performing the batch commit techniques described in this disclosure.

TABLE 2

| time | vty1 | vty2 | vty3 | vty4 | vty5 |
|---|---|---|---|---|---|
| 0 | set a | set b | set c | set d | set e |
| 0 | commit | commit | commit | commit | commit |
| 30 s | done | . . . | . . . | . . . | . . . |
| 1 m | | done | done | done | done |

In Table 2, management module 42 receives five commit commands nearly concurrently via Vty1-Vty5. Management module 42 may process the first commit command from Vty1 in the manner described above and, while processing the first commit command, implement the techniques described in this disclosure to "batch" the second through fifth commit commands, forming a single "job" that groups all configuration data associated with each of the second through fifth commit commands. Management module 42 may then execute this single job, validating the configuration data associated with each of these second through fifth commits commands as if this configuration data was entered via a single session and committed at once instead of sequentially entered and committed through four different sessions. Management module 42 may therefore take only 30 seconds to process the first commit command and then another 30 seconds to process the "job," for a total time of one minute. In comparison to the two minutes and 30 seconds it may take a conventional router to sequentially process all five commit commands, management module 42 may enter the same amount of configuration data in approximately one minute, which may significantly improve throughput in processing commit commands.

In operation, one or more of clients 20 may enter a "batch" configuration mode that may be similar to the private configuration mode. That is, in response to the "configure batch" command, management module 42 may allocate, create or otherwise provide a private DB 52 for private editing of configuration data in the manner described above. The following pseudocode illustrates an exemplary use of a configure command having a "batch" configuration mode:

user@host> configure batch
    user@host# set system host-name router_25
    user@host# commit When the one of clients 20 that entered the batch configuration mode, enters the "commit" command, control unit 32 generates a file (which may be similar to the patch file described above) containing the changes made during the batch configuration session. Control unit 32 may execute what may be referred to as a "commit server" that monitors a directory or other memory location to which these patch files are stored (i.e., commit queue 56 in the example of FIG. 3). The commit server is shown as a commit server 58 in the example of FIG. 3.

In response to detecting one or more patches stored to commit queue 56, commit server 58 enters an edit exclusive mode, generates a single batch patch file from the one or more patch files stored to commit queue 56 (by performing a so-called "load patch" process) and commits the single batch patch file to commit database 48 (after performing the verification of the single batch patch file in the manner described above). After committing the single batch patch file, commit server 58 may continue to monitor commit queue 56, generating batch patch files and committing the generated batch patch files to commit database 48.

In some instances, commit server 58 may process patch files stored to commit queue 56 back-to-back with some fixed pause between commits The pause may provide time for modules 46 to consume the committed configuration changes. In consuming these configuration changes, execution of modules 46 may significantly increase the amount of processing resources required resulting in what may be referred to as a "high system load." Commit server 58 may pause so as not to further increase the system load. In other instances, commit server 58 may perform commits separately and sequentially until system load exceeds a certain threshold or load level. Once the system load (as monitored by commit server 58 or provided by another one of modules 46) reaches the threshold, commit server 58 may begin batching patch files to generate batch patch files. In this sense, commit server 58 may dynamically perform batch commit of configuration data in response to a determination that a metric (such as system load or any other metric, including processor utilization, memory consumption, etc.) exceeds a threshold.

Additionally, in the batch configuration mode, management module 42 may provide for two types or modes of batch configuration, referred to as an "asynchronous" mode and a "synchronous" mode. In the asynchronous batch configuration mode, management module 42 adds patch files to commit queue 56 in response to receiving a commit command. In this instance, commit server 58 may detect the patch files, generate the batch patch file and commit the batch patch file to commit DB 48. Management module 42 may then exit the edit batch session without waiting for commit server 58 to finish (and receiving notification of the failure and/or success of the commit from commit server 58 asynchronously via a system log, hence the name "asynchronous batch configuration mode"). The entries in the system log may include a batch identifier associated with the asynchronous batch configuration mode and any comment added by the one of clients 20 (or a network management system with which the one of clients 20 is interacting to configure router 24), such as a queue identifier and commit batch comments. Management module 42 may return the prompt to the user via CLI 44, allowing the one of clients 20 that invoked the asynchronous batch configuration mode to enter additional configuration commands prior to completion of the commit command for the previous asynchronous batch configuration mode.

An example of the asynchronous mode follows below:

```
router# configure batch
router# set system host-name foo
router# show | compare
[edit system]
− host-name bar
+ host-name foo
router# commit
Added to commit queue request-id: 1343026
router#
```

In the asynchronous example, the prompt "router#" is returned nearly immediately after entering the "commit" command (and after displaying that the commit has been added to the commit queue with a request identifier (id) of "1343026").

Alternatively, in the synchronous batch configuration mode, management module 42 adds the patch to commit queue 56 in response to receiving a commit command (where commit server 58 may detect the patch files, generate the batch patch file and commit the batch patch file to commit DB 48). Management module 42 does not return the prompt to the one of clients 20 that invoked the synchronous batch configuration mode, but waits for commit server 58 to finish committing the configuration changes to commit database 48. Commit server 58 typically notifies management module 42 of the success and/or failure of the commit. Management module 42 may present this success and/or failure via CLI 44 to the one of clients 20 that invoked the configuration mode. On successful commit, management module 42 may present a success message via CLI 44 and return the prompt to the one of clients 20, maintaining the synchronous batch configuration session. On failure of the commit, management module 42 may present a failure message via CLI 44 and return the prompt to the one of clients 20, maintaining the synchronous batch configuration session. Management module 42 may also update the system log to include the success/failure messages in the manner described above.

An example of the synchronous mode follows below:

```
router# configure batch
router# set system host-name foo
router# show | compare
[edit system]
- host-name bar
+ host-name foo
router# commit
Added to commit queue request-id: 1343115load complete
commit success
router#
```

In the synchronous example, the prompt "router#" is returned only after the "load complete" and "commit success" messages have been displayed via CLI 44.

To configure commit server 58, one or more of clients 20 may enter configuration information to control the maximum number of patch files that may be aggregated to form a batch patch file (or "job"), a maximum number of patch files that may be queued, whether the batch configuration mode is asynchronous or synchronous, a commit interval that indicates a time in seconds to wait between starting the next job and other configuration information regarding the system log, such as a number of days to keep error logs. As one example, the commit server configuration information may be specified in the following exemplary way:

```
system {
        commit {
+           queue {
+               maximum-aggregate-pool 10;
+               maximum-entries 500;
+               asynchronous-commit;
+               commit-interval 0;
+               days-to-keep-error-logs 30;
+           }
        }
}
```

The above configuration information indicates that the maximum aggregate pool of patch files ("maximum-aggregate-pool") that may be aggregated or grouped to form a batch patch file is 10, the maximum number of patch files or entries ("maximum-entries") that can be stored to commit queue 56 is 500, asynchronous commit mode has been enabled ("asynchronous-commit"), the commit interval ("commit-interval") is zero and that the number of days to keep error logs ("days-to-keep-error-logs") is 30.

In some respects, the various configuration options to configure commit server 58 may provide for a variety of benefits. For example, specifying a smaller maximum aggregate pool may reduce the amount of configuration data that is not committed when an error occurs. To illustrate, consider aggregation of 10 separate patch files with one of the patch files having a commit error. Batching these 10 separate patch files to form a batch patch file and attempting to commit the batch patch file would therefore result in an error such that none of the 9 other error-free patch files are entered despite that these patch files would have otherwise been entered had they been separately committed. Consequently, specifying a smaller maximum aggregate pool number may reduce the likelihood of patch files being error free but not committed due to errors in other aggregated patch files.

Also, the asynchronous mode, while providing a more responsive user experience in terms of returning the prompt to the one of clients 20 prior to completion of the commit, may also enable clients 20 to enter more configuration data more quickly. As a result, the asynchronous mode may result in overruns of the maximum entries specified for commit queue 56. If this maximum entries threshold is exceeded, commit sever 58 may return an error command, preventing this configuration data from being entered. The commit interval configuration setting may insert delay such that more time is given between execution of the batching process to aggregate patch files stored to commit queue 56. A large commit interval may result in a higher percentage of batch patch files having been formed from the maximum aggregate pool number rather than a lower number of patch files. A smaller commit interval may result in a lower percentage of batch patch files having been formed from the maximum aggregate pool number, especially in systems for which configuration information is infrequently entered in comparison to other systems.

When committing a batch patch file, commit server 58 may encounter, as noted above, one or more errors. Typically, in response to these errors, commit server 58 generates a commit failure message, either logging this message to a system log (not shown in the example of FIG. 3 for ease of illustration purposes) or presenting the message to the corresponding one of clients 20 via CLI 44. In some instances, commit server 58 may request the one of clients 20 to manually resolve the error by, for example, re-entering the configuration information. In other instances, commit server 58 may attempt to break the batch patch file back into its respective patch files and commit each of the patch files separately, so that those of the patch files that do not have any errors may be committed. In this instance, commit server 58 may determine which of the patch files specifically caused the error and return more specific failure information identifying the one of patch files that caused the error. In operation, commit server 58 may return the patch files of the error batch patch file to commit queue 56, associating each of these patch files with a flag referred to as an "atomic" flag that indicates that these patch files are to be committed separately and individually or "atomically." Upon de-queuing these patch files associated with the atomic flag, commit server 58 commits each of these patch files separately.

In some instances, management module 42 and/or commit server 58 may associate each of the patch files with a priority flag. The priority flag may indicate a priority associated with the patch file and dictate when commit server 58 commits the associated patch file with respect to other patch files stored to commit queue 56. Management module 42 may associate patch files with different priorities, as one example, to resolve conflicts in configuring the same configuration variable. That is, if two or more of clients 20 are attempting to nearly concurrently configure the same aspect of router 24, management module 42 may specify a priority with respect to each of the resulting configuration patches such that the changes to the same aspect of router 24 is carried out in the same order the commits were received. Commit server 58 may, as noted above, re-commit the separate patches in response to detecting a commit error when committing a batch patch file. Commit server 58 may, in these instances, associate the individual patch files forming the batch patch file with a priority flag or otherwise update, edit or change the priority flag to which each of these individual patch files are associated.

Management module 42 may also expose via CLI 44 a number of commands by which clients 20 may view information associated with and interact with commit server 58. To provide a few examples, management module 42 may provide for the following commands:

```
show system commit server queue [id <id>] [patch | log]
show system commit server status
request system commit queue kill (id <id> | all)
request system commit server queue cleanup (id <id> | all)
request system commit server pause
request system commit server start
```

The show system commit server queue command (followed optionally by an identifier (id) and/or a patch or log option) may display one or all queue entries. If the patch option is specified, management module 42 may display patches inside the queue entry. If the log option is specified, management module 42 may display the log entry associated with the patch, where the log entries may specify the error and status messages associated with the patch.

The show system commit server status command, when entered, causes management module 42 to display the status of commit server 58 (e.g., running, paused, stopped, etc.). The request system commit queue kill (followed optionally by an identifier (id) or the all option), when entered, causes management module 42 to delete one queue entry (specified by the identifier) or all of the queue entries. The request system commit server queue cleanup (followed optionally by the id or all), when entered, causes management module 42 to remove any temporary files from the queue directory (meaning the directory to which commit queue 56 is stored). The request system commit server pause and start commands, when entered, cause management module 42 to pause or start commit server 58, respectively.

Figure 4:
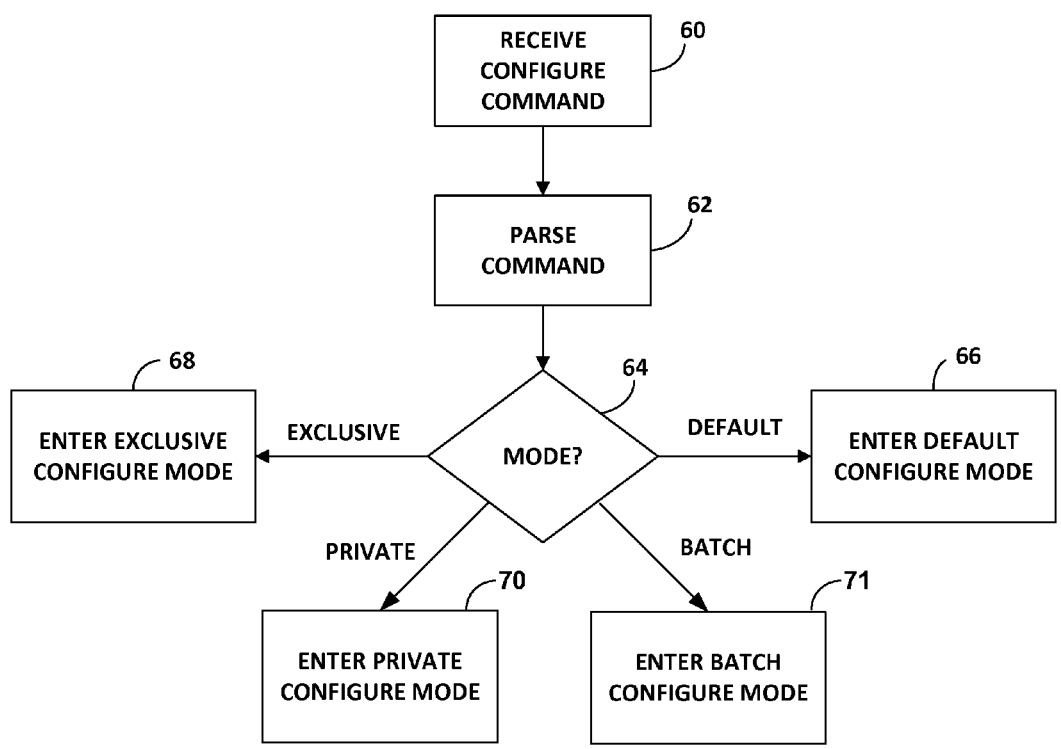
FIG. 4 is a flowchart illustrating a management module executed by the control unit shown in the example of FIG. 3 entering a configuration mode in response to a configure command.

FIG. 4 is a flowchart illustrating management module 42 entering a configuration mode in response to a configure command from one of clients 20. Initially, management module 42 receives a command from one of clients 20 to configure router 24 (60). In response to receiving a configure command from one of clients 20, management module 42 may parse the command to determine which configuration mode to operate in (62, 64). When the configure command includes no additional parameters that specify a particular configuration mode, management module 42 operates in a default configure mode (66). In this mode, management module 42 allows clients 20 to concurrently edit shared database 50. If one of clients 20 issues a commit command, all of the changes, complete or incomplete, made by clients 20 may be committed to committed database 48.

When the configure command includes the additional parameter exclusive, management module 42 operates in an exclusive configure mode (68). In exclusive configuration mode, management module 42 allows only one of clients 20 to edit configuration data of shared database 50 at a time. Allowing only one client 20 at a time to edit shared database 50 may prevent interference between client 20 in the exclusive configure mode and other clients 20 in different configuration modes. When receiving a commit command from the client 20 in the exclusive configure mode, management module 42 copies shared database 50 to committed database 48.

When the configure command includes the additional parameter private, management module 42 operates in a private configure mode (70). In private configure mode multiple clients 20 may concurrently issue configuration commands to management module 42. In particular, for each of clients 20 that issues a configure private command, management module 42 creates a respective private database 52 from committed database 48 that stores the present configuration of the device. Management module 42 applies configuration commands from clients 20 to their respective private databases 52. Upon receiving a commit command from any given one of clients 20, management module 42 merges the edited data of the respective one of private database 52 into configuration data of committed database 48. In particular, management module 42 generates a "patch" representing the changes to one of private databases 52, and applies the patch into committed database 48.

When the configure command includes the additional parameter batch, management module 42 operates in a batch configure mode (71). In batch configure mode multiple clients 20 may concurrently issue configuration commands to management module 42. In particular, for each of clients 20 that issues a configure batch command, management module 42 creates a respective private database 52 from committed database 48 that stores the present configuration of the device. Management module 42 applies configuration commands from clients 20 to their respective private databases 52. Upon receiving a commit command from any given one of clients 20, management module 42 determines the patch file of the differences between the configuration data stored to the corresponding one of private database 52 and the configuration data of committed database 48. Management module 42 then stores the patch file to commit queue 56, where commit server 58 either detects and processes the patch file in the manner described above to generate a batch patch file. Alternatively, management module 42 invokes commit server 58 to process the patch file in the manner described above to generate a batch patch file. In any event, commit server 58 commits the batch patch file to committed database 48.

Figure 5:
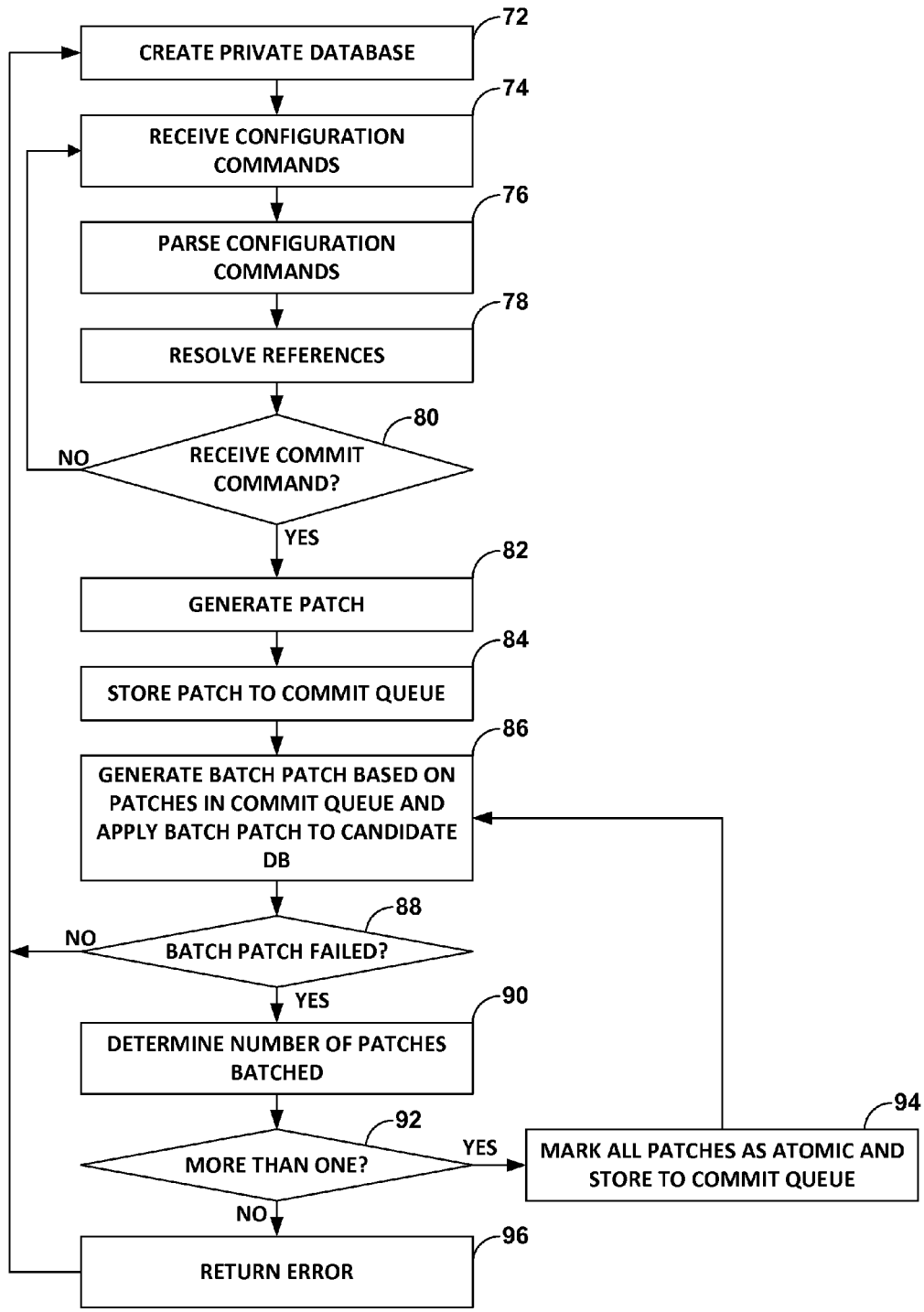
FIG. 5 is a flowchart illustrating the management module operating in a batch configure mode in response to receiving a configure batch command.

FIG. 5 is a flowchart illustrating management module 42 operating in a batch configure mode in response to receiving a configure batch command. In response, management module 42 creates a private database 52 for the requesting client 20 that issued the configure batch command (72). As described, private database 52 may be a replicate of committed database 48 at the time the request is received. Alternatively, private database 52 may be a copy of configuration data in shared database 50. In addition, management module may make a corresponding copy of configuration text file 54, which may comprise an ASCII file, at the time of the request.

Next, client 20 may edit the configuration data of private database 52 by issuing one or more configuration commands to management module 42 (74). Private database 52 allows client 20 to edit data without interference from other clients 20 who may also be editing the configuration of router 24. For example, if client 20 issues a rollback command, the configuration data of the respective private database 52 may be updated with a current copy of configuration data from committed database 48. Meanwhile, the edited configuration data of a private database 52 associated with another one of clients 20 remains unchanged.

Management module 42 may parse the configuration commands input from client 20, and resolve the references to appropriately configure router 24 (76, 78). Management module 42 waits to receive a commit command that indicates the completion of editing of private database 52 (80). When a commit command has not been received from client 20, management module 42 continues to receive configuration commands (74-80). However, upon receiving a commit command, management module 42 generates a patch representing the changes to private database 52 and stores the patch to commit queue 48 in the manner described above (82, 84). Commit server 58 may then aggregate one or more of the patches stored to commit queue 56, generating a batch patch based on the one or more of the patches stored to commit queue 56 in the manner described above, and apply the batch patch to a candidate DB (86). The candidate DB may refer to one of private DBs 52, commit DB 48 or any other DB that may store the configuration data as modified by the batch patch prior to the validation of the configuration data stored to the DB.

Commit server 58 may next validate or otherwise determine whether application of the batch patch failed (88). If the batch patch was successfully applied, meaning that the batch patch did not fail ("NO" 88), commit server 58 may report this success to management module 42 and publish this candidate DB as commit DB 48 so that the configuration data of DB 48 may be consumed by modules 46. Router 24 may continue to implement the techniques in the manner described above (72-88). However, if the batch patch was not successfully applied, meaning that the batch patch failed ("YES" 88), commit server 58 may determine the number of patches that were batched (90). If this number of patches that were batched is more than one ("YES" 92), commit server 58 marks all of these patches as "atomic" in the manner described above and stores each of the patches to the commit queue, where each of these patches are re-executed individually (94, 86-92). If the number of patches that were batched is not more than one ("NO" 92), commit server 58 returns an error and router 24 continues to operate in the manner described above (96, 72-96).

In one or more examples, the functions described may be implemented in a control unit, which may comprise hardware, software, firmware, or any combination thereof. If implemented in software, the functions may be stored on as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure.

By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the techniques have been described. These and other embodiments are within the scope of the following claims.

The invention claimed is:

1. A method comprising:
   establishing, with a network device, a plurality of sessions with a plurality of clients by which to receive a plurality of commands to configure a committed data source that stores current configuration data for the network device;
   for each of the plurality of clients, creating, with the network device, a private data source from the committed data source in response to the commands, the private data source storing a separate copy of the current configuration data for the network device;
   storing, with the network device, the configuration changes to the corresponding one of the private data sources,
   receiving, with the network device, a plurality of separate commit commands via at least two or more of the plurality of sessions associated with two or more of the plurality of clients, the plurality of separate commit commands each instructing the network device to commit an associated portion of the configuration changes stored to the corresponding one of the private data sources to the committed data source;
   grouping, with the network device, the portions of the configuration changes associated with the plurality of separate commit commands to form a batch job; and
   executing the batch job to, at least in part, merge the portions of the configuration changes stored to those of the private data sources associated with plurality of separate commit commands into the committed data source as if the grouped portions of the configuration changes were associated with a single commit command.

2. The method of claim 1, further comprising:
   prior to receiving the plurality of commit commands, receiving a command to configure the network device to operate in a batch configuration mode for each of the plurality of sessions,
   wherein receiving the plurality of separate commit commands comprises receiving the plurality of separate commit commands when the network device is configured to operate the batch configuration mode for each of the two or more of the plurality of sessions.

3. The method of claim 1,
   wherein storing the configuration changes comprises storing the configuration changes to the corresponding one of the private data sources such that the private data sources store updated configuration data, and
   wherein the method further comprises:
   responsive to receiving the plurality of commit commands, determining a difference between the updated configuration data stored to each of the private data sources associated with the plurality of sessions and the current configuration data;

generating a plurality of patch files based on the determined differences between the updated configuration data stored to each of the private data sources and the current configuration data; and storing the plurality of patch files to a commit queue, wherein grouping the portions of the configuration changes associated with the plurality of separate commit commands to form the batch job comprises grouping the plurality of patch files together to form a batch patch file, and wherein executing the batch job to, at least in part, merge the portions of the configuration changes comprises applying the batch patch file to the committed data source to commit the portions of the configuration changes associated with the plurality of separate commit commands to the committed data source.

4. The method of claim 3, further comprising receiving a configuration command specifying a maximum number of patch files to be grouped together when forming the batch patch file, wherein grouping the two or more of the plurality of patch files comprises grouping the two or more of the plurality of patch files together to form the batch patch file such that the no more than the specified maximum number of patch files are grouped together to form the batch patch file.

5. The method of claim 3, further comprising:

determining whether the execution of the batch of commit commands resulted in a commit error;

in response to the determination that the execution of the commit commands resulted in the commit error, removing any of the portions of the configuration changes committed to the committed data source prior to the commit error, associating each of the two or more of the plurality of patch files with a flag that indicates each of the two or more of the plurality of patch files are to be separately committed to the committed data source and storing each of two or more of the plurality of patch files to the commit queue.

6. The method of claim 1, further comprising receiving a configuration command specifying an asynchronous mode of execution for the batch of commit commands, wherein executing the batch of commit commands to, at least in part, merge the portions of the configuration changes comprises executing the batch of commit commands in accordance with the asynchronous mode such that control is returned to a client prior to the completion of committing the portions of the configuration changes associated with the grouped plurality of separate commit commands to the committed data source.

7. The method of claim 1, further comprising receiving a configuration command specifying an synchronous mode of execution for the batch of commit commands, wherein executing the batch of commit commands to, at least in part, merge the portions of the configuration changes comprises executing the batch of commit commands in accordance with the synchronous mode such that control is not returned to a client until all of the portions of the configuration changes associated with the grouped plurality of separate commit commands have been committed to the committed data source.

8. The method of claim 1, further comprising, prior to receiving each of the plurality of separate commit commands, receiving a configure batch command instructing the network device to enter a batch configuration mode in which any subsequent commands received after the configure batch command specify the portions of the configuration changes associated with the plurality of separate commit commands.

9. A network device comprising:

a committed data source that stores current configuration data for the network device; and a control unit that establishes a plurality of sessions with a plurality of clients by which to receive a plurality of commands to configure a committed data source that stores current configuration data for a network device, and for each of the plurality of clients, creates a private data source from the committed data source in response to the commands, the private data source storing a separate copy of the current configuration data for the network device, stores the configuration changes to the corresponding one of the private data sources, and receives a plurality of separate commit commands via at least two or more of the plurality of sessions associated with two or more of the plurality of clients, the plurality of separate commit commands each instructing the network device to commit an associated portion of the configuration changes stored to the corresponding one of the private data sources to the committed data source, and wherein the control unit groups the plurality of separate commit commands to form a batch of commit commands, wherein the batch of commit commands instructs the network device to commit the portions of the configuration changes associated with the grouped plurality of separate commit commands to the committed data source and executes the batch of commit commands to, at least in part, merge the portions of the configuration changes stored to those of the private data sources associated with the plurality of separate commit commands into the committed data source as if the grouped portions of the configuration changes were associated with a single commit command.

10. The network device of claim 9, wherein the control unit includes a management module that establishes the plurality of sessions with the plurality of clients by which to receive the plurality of commit commands from the plurality of clients, and prior to receiving the plurality of commit commands, receives a command to configure the network device to operate in a batch configuration mode for each of the two or more of the plurality of sessions, wherein the management module receives the plurality of separate commit commands when the network device is configured to operate the batch configuration mode for each of the one or more sessions.

11. The network device of claim 9, wherein the control unit includes:

a management interface that establishes the plurality of sessions with the plurality of clients by which to receive the plurality of commands to configure the committed data source that stores the current configuration data for the network device, and for each of the plurality of sessions, creates a private data source from the committed data source in response to the commands such that the private data source stores the copy of the current configuration data and stores the configuration changes to the corresponding one of the private data sources such that the private data sources store updated configuration data;

a commit server that, responsive to receiving the plurality of commit commands, determines a difference between the updated configuration data stored to each of the private data sources associated with the plurality of sessions and the current configuration data, generates a plurality of patch files based on the determined differences between the updated configuration data stored to each of the private data sources and the current configuration data, stores the plurality of patch files to a commit queue, groups the two or more of the plurality of patch files together to form a batch patch file and applies the batch patch file to the committed data source to commit the portions of the configuration changes associated with the plurality of separate commit commands to the committed data source.

12. The network device of claim 11,
wherein the management interface receives a configuration command specifying a maximum number of patch files to be grouped together when forming the batch patch file,
wherein the commit server groups the two or more of the plurality of patch files together to form the batch patch file such that the no more than the specified maximum number of patch files are grouped together to form the batch patch file.

13. The network device of claim 11, wherein the commit server determines whether the execution of the batch of commit commands resulted in a commit error and, in response to the determination that the execution of the commit commands resulted in the commit error, removes any of the portions of the configuration changes committed to the committed data source prior to the commit error, associating each of the two or more of the plurality of patch files with a flag that indicates each of the two or more of the plurality of patch files are to be separately committed to the committed data source and storing each of two or more of the plurality of patch files to the commit queue.

14. The network device of claim 9, wherein the control unit includes:
a management module that receives a configuration command specifying an asynchronous mode of execution for the batch of commit commands; and
a commit server that executes the batch of commit commands to, at least in part, merge the portions of the configuration changes in accordance with the asynchronous mode such that control is returned to a client prior to the completion of committing the portions of the configuration changes associated with the grouped plurality of separate commit commands to the committed data source.

15. The network device of claim 9, wherein the control unit includes:
a management module that receives a configuration command specifying an synchronous mode of execution for the batch of commit commands; and
a commit server that executes the batch of commit commands to, at least in part, merge the portions of the configuration changes in accordance with the synchronous mode such that control is not returned to a client until all of the portions of the configuration changes associated with the grouped plurality of separate commit commands have been committed to the committed data source.

16. The network device of claim 9, wherein the control unit includes a management module that, prior to receiving each of the plurality of separate commit commands, receives a configure batch command instructing the network device to enter a batch configuration mode in which any subsequent commands received after the configure batch command specify the portions of the configuration changes associated with the plurality of separate commit commands.

17. A non-transitory computer-readable medium comprising instructions that, when executed, cause one or more processor of a network device to:
establish a plurality of sessions with a plurality of clients by which to receive a plurality of commands to configure a committed data source that stores current configuration data for a network device;
for each of the plurality of clients, create a private data source from the committed data source in response to the commands, the private data source storing a separate copy of the current configuration data for the network device;
storing the configuration changes to the corresponding one of the private data sources,
receive a plurality of separate commit commands via at least two or more of the plurality of sessions associated with two or more of the plurality of clients, the plurality of separate commit commands each instructing the network device to commit an associated portion of the configuration changes stored to the corresponding one of the private data sources to the committed data source;
group the plurality of separate commit commands to form a batch of commit commands, wherein the batch of commit commands instructs the network device to commit the portions of the configuration changes associated with the grouped plurality of separate commit commands to the committed data source; and
execute the batch of commit commands to, at least in part, merge the portions of the configuration changes stored to those of the private data sources associated with the plurality of separate commit commands into the committed data source as if the grouped portions of the configuration changes were associated with a single commit command.

18. The non-transitory computer-readable medium of claim 17, wherein the instructions, when executed, further cause the one or more processors to:
prior to receiving the plurality of commit commands, receive a command to configure the network device to operate in a batch configuration mode for each of the one or more of sessions,
receive the plurality of separate commit commands when the network device is configured to operate the batch configuration mode for each of the two or more of the plurality of sessions.

19. The non-transitory computer-readable medium of claim 17, wherein the instructions, when executed, further cause the one or more processors to:
store the configuration changes to the corresponding one of the private data sources such that the private data sources store updated configuration data;
responsive to receiving the plurality of commit commands, determine a difference between the updated configuration data stored to each of the private data sources associated with the plurality of sessions and the current configuration data;
generate a plurality of patch files based on the determined differences between the updated configuration data stored to each of the private data sources and the current configuration data;
store the plurality of patch files to a commit queue;
group two or more of the plurality of patch files together to form a batch patch file, and apply the batch patch file to the committed data source to merge the portions of the configuration changes associated with the plurality of separate commit commands to the committed data source.

20. The non-transitory computer-readable medium of claim 19, wherein the instructions, when executed, further cause the one or more processors to:
receive a configuration command specifying a maximum number of patch files to be grouped together when forming the batch patch file; and
group the two or more of the plurality of patch files together to form the batch patch file such that the no more than the specified maximum number of patch files are grouped together to form the batch patch file.

21. The non-transitory computer-readable medium of claim 19, wherein the instructions, when executed, further cause the one or more processors to:
determine whether the execution of the batch of commit commands resulted in a commit error;
in response to the determination that the execution of the commit commands resulted in the commit error, remove any of the portions of the configuration changes committed to the committed data source prior to the commit error, associating each of the two or more of the plurality of patch files with a flag that indicates each of the two or more of the plurality of patch files are to be separately committed to the committed data source and storing each of two or more of the plurality of patch files to the commit queue.

22. The non-transitory computer-readable medium of claim 17, wherein the instructions, when executed, further cause the one or more processors to:
receive a configuration command specifying an asynchronous mode of execution for the batch of commit commands; and
execute the batch of commit commands in accordance with the asynchronous mode such that control is returned to a client prior to the completion of committing the portions of the configuration changes associated with the grouped plurality of separate commit commands to the committed data source.

23. The non-transitory computer-readable medium of claim 17, wherein the instructions, when executed, further cause the one or more processors to:
receive a configuration command specifying an synchronous mode of execution for the batch of commit commands; and
execute the batch of commit commands in accordance with the synchronous mode such that control is not returned to a client until all of the portions of the configuration changes associated with the grouped plurality of separate commit commands have been committed to the committed data source.

24. The non-transitory computer-readable medium of claim 17, wherein the instructions, when executed, further cause the one or more processors to, prior to receiving each of the plurality of separate commit commands, receiving a configure batch command instructing the network device to enter a batch configuration mode in which any subsequent commands received after the configure batch command specify the portions of the configuration changes associated with the plurality of separate commit commands.

\* \* \* \* \*